United States Patent
Huang

(10) Patent No.: US 8,348,813 B2
(45) Date of Patent: Jan. 8, 2013

(54) TREADMILL HAVING ROLLER STRUCTURE

(75) Inventor: Te-Li Huang, Taichung County (TW)

(73) Assignee: Yihsuan Enterprise Co., Ltd., Taichung County (TW)

( * ) Notice: Subject to any disclaimer, the term of this patent is extended or adjusted under 35 U.S.C. 154(b) by 0 days.

(21) Appl. No.: 13/339,482

(22) Filed: Dec. 29, 2011

(65) Prior Publication Data

US 2012/0100964 A1    Apr. 26, 2012

Related U.S. Application Data

(62) Division of application No. 12/818,390, filed on Jun. 18, 2010.

(30) Foreign Application Priority Data

Jun. 24, 2009  (TW) ............................ 98211349 U

(51) Int. Cl.
*A63B 22/02*  (2006.01)
*B65G 13/00*  (2006.01)

(52) U.S. Cl. .......................... 482/54; 198/788

(58) Field of Classification Search .............. 482/51, 482/54; 198/788
See application file for complete search history.

(56) References Cited

U.S. PATENT DOCUMENTS

| | | | | |
|---|---|---|---|---|
| 1,881,267 A * | 10/1932 | Drexler | ................ | 198/788 |
| 2,915,167 A * | 12/1959 | Berger | ................ | 198/788 |
| 3,064,797 A * | 11/1962 | Besel et al. | ................ | 198/813 |
| 3,222,954 A * | 12/1965 | Wuertz | ................ | 475/159 |
| 3,568,821 A * | 3/1971 | Gronkvist | ................ | 198/788 |
| 3,698,539 A * | 10/1972 | Schwarzbeck | ................ | 198/722 |
| 3,712,454 A * | 1/1973 | McKee | ................ | 198/782 |
| 3,737,022 A * | 6/1973 | DeNeefe et al. | ................ | 198/782 |
| 4,008,800 A * | 2/1977 | Forsyth | ................ | 198/782 |
| 4,013,166 A * | 3/1977 | Weady et al. | ................ | 198/835 |
| 4,697,694 A * | 10/1987 | Huber | ................ | 198/782 |
| 4,749,169 A * | 6/1988 | Pickles | ................ | 254/122 |
| 4,930,415 A * | 6/1990 | Hara et al. | ................ | 101/228 |
| 5,048,672 A * | 9/1991 | Sundseth | ................ | 198/782 |
| 5,088,596 A * | 2/1992 | Agnoff | ................ | 198/788 |
| 5,120,200 A * | 6/1992 | Carter, III | ................ | 417/295 |
| 5,215,184 A * | 6/1993 | Huber | ................ | 198/782 |
| 5,413,209 A * | 5/1995 | Werner | ................ | 198/500 |
| 5,509,872 A * | 4/1996 | Chen | ................ | 482/54 |
| 5,811,137 A * | 9/1998 | Clark et al. | ................ | 425/194 |
| 5,887,845 A * | 3/1999 | Urbanczyk | ................ | 248/637 |
| 5,927,477 A * | 7/1999 | Meittunen | ................ | 198/788 |
| 5,984,615 A * | 11/1999 | Sundseth | ................ | 414/534 |
| 6,302,826 B1 * | 10/2001 | Lee | ................ | 482/54 |
| 6,443,295 B1 * | 9/2002 | Hill | ................ | 198/788 |
| 6,672,449 B2 * | 1/2004 | Nakamura et al. | ................ | 198/788 |
| 6,764,430 B1 * | 7/2004 | Fencel | ................ | 482/54 |
| 7,207,433 B2 * | 4/2007 | Schaefer | ................ | 198/788 |

(Continued)

*Primary Examiner* — Stephen Crow
(74) *Attorney, Agent, or Firm* — Rosenberg, Klein & Lee

(57) ABSTRACT

A treadmill roller structure comprises a motor, a gear set and a case. The motor is an out-runner motor. The power output section of the motor rotates about stationary spindle. The rotary power output section is engaged to the gear set, while the gear set is in turn engaged to the case, thus allowing the case to rotate relatively to the spindle of the motor as well. The roller structure does not require a driving belt to transfer power from the motor to the roller, thus reduces the power loss due to frictional force during power transfer through belt driving, which enhances the performance of the motor and offers a space-saving feature. In addition, the instant disclosure also provides a treadmill.

12 Claims, 8 Drawing Sheets

U.S. PATENT DOCUMENTS 7,299,915 B2 * 11/2007 El-Ibiary .................... 198/788
7,618,352 B1 * 11/2009 Wei ............................. 482/54
2004/0071559 A1 * 4/2004 Ai et al. ..................... 417/220
2007/0144753 A1 * 6/2007 Miller ......................... 173/217

* cited by examiner

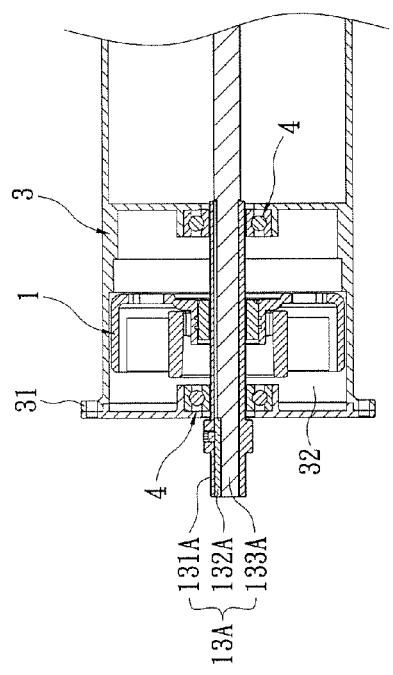
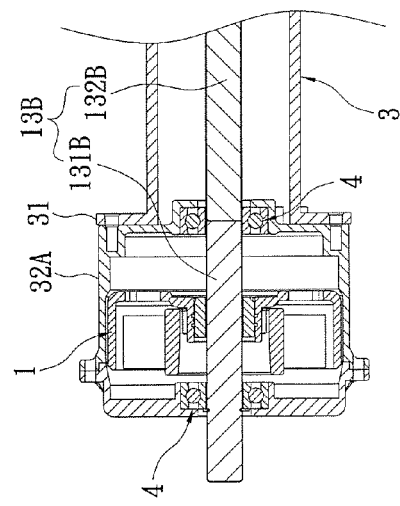

TREADMILL HAVING ROLLER STRUCTURE

RELATED APPLICATIONS

This application is a Divisional patent application of copending application Ser. No. 12/818,390, filed on 18 Jun. 2010, now pending. The entire disclosure of the prior application, Ser. No. 12/818,390, from which an oath or declaration is supplied, is considered a part of the disclosure of the accompanying Divisional application and is hereby incorporated by reference.

BACKGROUND OF THE INVENTION

1. Field of the Invention

The instant disclosure relates to a treadmill roller structure; in particular, the instant disclosure relates to a roller structure in a treadmill device.

2. Description of Related Art

In the modern world, dense metropolitan population and crowded living environment make it difficult for the city residents to find appropriate locations for sport activities and fitness exercises. To address such an issue, indoor sport equipments, such as treadmills, exercise bikes or skiing machines are developed. These equipments can be installed indoor, thus breaking the spatial constrains and temporal limitations.

In a conventional treadmill, a drive belt is employed to drive the rollers. In a conventional setup, a front roller and a rear roller are respectively installed at the front side and the rear side of the base, and a treadmill belt is then set between the front roller and the rear roller, thereby enabling the treadmill belt to cyclically rotate for a user's jogging. Power is transferred through a belt placed between the front roller and a motor, and the power output axle of the motor is connected to one end of the belt, while the front roller connected to the other end thereof. Therefore, as the motor operates, the belt brings the front roller to rotate, and the front roller in turn links the treadmill belt, so the treadmill belt can cyclically rotate between the front roller and the rear roller.

However, separate installations of the motor and the front roller in a prior art treadmill may cause following drawbacks. It is required to reserve space in advance for placement of the motor n the treadmill base, so the area taken by the treadmill can be exceedingly large which may not be suitable for domestic applications. Besides, the configuration of separately installed motor needs to use an additional belt to bring the front roller to rotate. Frictions exist respectively between the belt and motor output axle as well as between the belt and the front roller, and such frictions neutralize certain parts of motor output power, undesirably leading to partial losses during transfer of motor output power. Furthermore, idle rotations tend to occur in case that the speed of belt transfer becomes too fast while the contact friction between the belt and the front roller is insufficient, so the power output from the motor may not be efficiently transferred the front roller, thus also resulting in unwanted partial losses in motor output power during power transfer.

Accordingly, in view of the amendable drawbacks illustrated as above, the inventors of the instant disclosure, based on long-term studies along with profound technical and theoretical researches, provide a design disclosed herein which effectively improves the defects set forth in the aforementioned texts.

SUMMARY OF THE INVENTION

The objective of the instant disclosure is to provide a treadmill roller structure and a treadmill which configures the motor and the gear set inside or outside of the roller, such that the roller can actively rotate, facilitating enhancement in performance of the motor and the feature of space saving. In addition, it is not required to use a belt to bring the roller to rotate, so the friction losses during power transfer can be desirably reduced, thereby increasing efficiency of the motor as well.

To achieve the objective mentioned as above, the instant disclosure provides a treadmill roller structure, comprising: a motor, which is an inner-piece out-runner motor and consists of a spindle and a power output section, wherein the power output section rotates relatively to the spindle; a gear set, which is fixedly installed to the spindle, wherein the power output section engages with the gear set; and a case, wherein the gear set engages with the case, and the case rotates relatively to the spindle.

The instant disclosure also provides a treadmill which comprises a base, wherein a front roller and a rear roller are respectively installed at the front end of the base and the rear end of the base, and a treadmill belt is set between the front roller and the rear roller, characterized in that, one of the front roller and the rear roller comprises: a motor, which is an inner-piece out-runner motor and consists of a spindle and a power output section, wherein the power output section rotates relatively to the spindle; a gear set, which is fixedly installed to the spindle, wherein the power output section engages with the gear set; and a case, wherein the gear set engages with the case, and the case rotates relatively to the spindle.

The instant disclosure enables the following beneficial effects:

1. since the motor and the gear set are installed inside or outside of the case, the power generated by the motor can bring the case to rotate directly through the engagement between the gear set and the inner gear ring. The case can thus actively rotate without additional use of belt, hence advantageously lessening motor output power losses which may occur during transfer. Besides, simplified roller structure also facilitates reduction of manufacture cost;

2. as the motor operates, the outputted motor power enables the power output section to rotate, thereby linking the solar gear so in turn the planetary gear, further together generating rotations of the inner gear ring and the case. In this way, by means of the tooth number ratio between the solar gear and the planetary gear, the output power from the motor can be amplified in multiples, efficiently transferred to the case so as to increase the performance of the motor;

3. the motor can be as demand installed inside or outside of the case, so it needs not to reserve space in advance for placement of the motor, thereby effectively scaling down the area required for installation of the treadmill, improving convenience in use and facilitating easy transportation.

In order to further appreciate the features and technical contents of the instant disclosure, references are hereunder made to the detailed descriptions of the instant disclosure and appended drawings therefore; whereas the appended drawings are simply exemplary and illustrative, rather than for the purpose of limitations to the instant disclosure.

BRIEF DESCRIPTION OF THE DRAWINGS

FIG. 8 is a cross-section view for a fifth preferred embodiment of the treadmill roller structure according to the instant disclosure.

FIG. 9 is a cross-section view for a sixth preferred embodiment of the treadmill roller structure according to the instant disclosure.

DETAILED DESCRIPTION OF THE PREFERRED EMBODIMENTS

Figure 1:
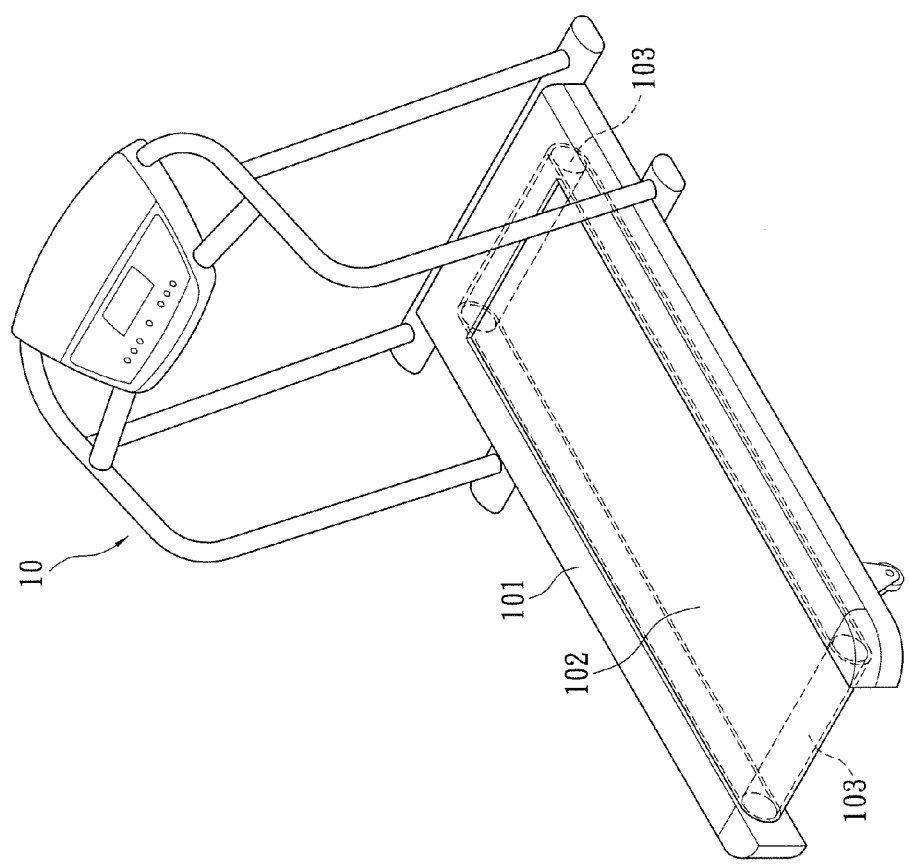
FIG. 1 is an assembly graph of the treadmill roller structure and the treadmill according to the instant disclosure.
Figure 2:
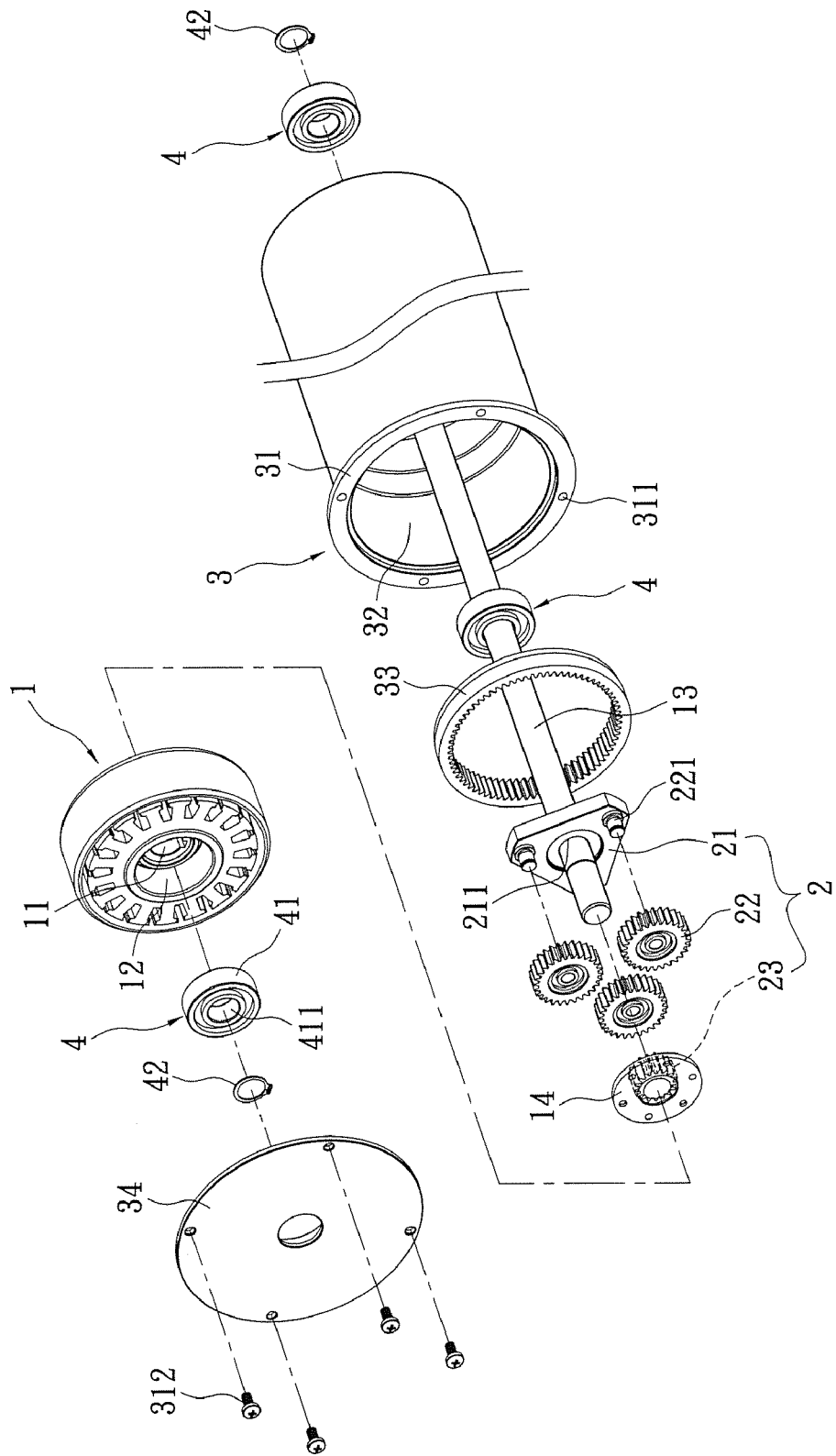
FIG. 2 is a disassembly graph for a first preferred embodiment of the treadmill roller structure according to the instant disclosure.
Figure 3:
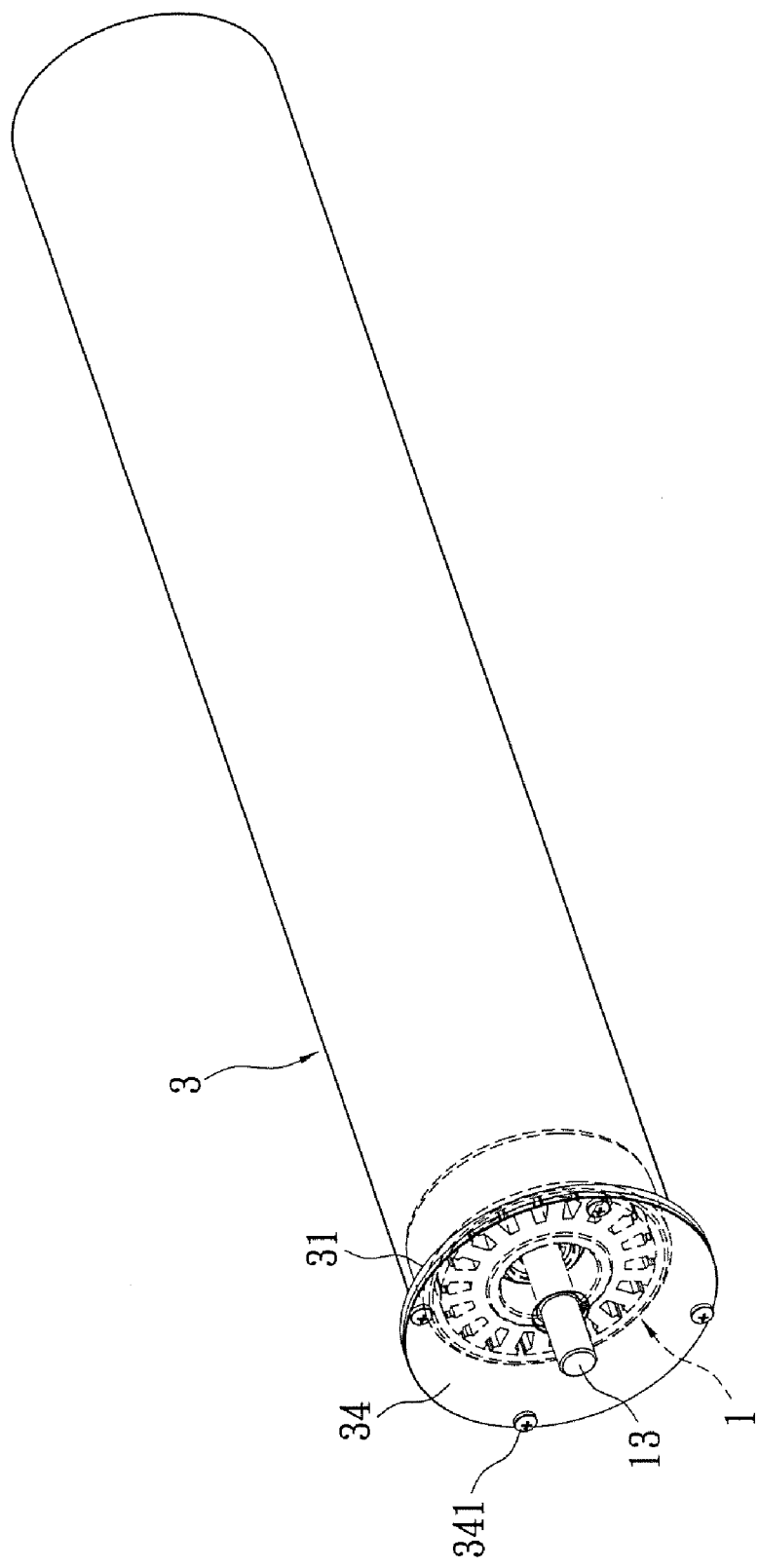
FIG. 3 is a three dimensional view for the first preferred embodiment of the treadmill roller structure according to the instant disclosure.

Referring initially to FIGS. 1, 2 and 3. The instant disclosure provides a treadmill roller structure. The roller structure is installed at the front and the rear end of the base 101 of a treadmill 10 to the treadmill belt 102 around the front and the rear roller 103. The roller 103 comprises a motor 1, a gear set 2, a case 3 and a plurality of motion limiting assemblies 4.

The motor 1 is an out-runner motor having a motor axle bore 11, an accommodation chamber 12, a spindle 13 and a power output section 14. The motor axle bore 11 is located in the accommodation chamber 12 of the motor 1. The accommodation chamber 12 is able to accommodate the motion limiting assemblies 4. The spindle 13 passes through the motor axle bore 11 of the motor 1, the gear set 2, the case 3, and the motion limiting assemblies 4. The spindle 13 is a fixed supporting structure that does not rotate; rather, the motor 1 is installed through the spindle 13 in a fashion that the rotating belt of the motor rotates about the stationary spindle 13. The power output section 14 is rigidly installed to the rotating belt of the motor 1 and is thus rotatable about the stationary spindle 13 to drive the gear set 2 when power is supplied to the motor. Moreover, the spindle 13 is installed in a cross-over fashion to the base 101 of the treadmill 10 as a supportive axle for the roller 103.

Gear set 2 comprises of a fixing seat 21, a plurality of planetary gears 22, and a solar gear 23. The fixing seat 21 has an axle bore 211 at the center for fitting through the spindle 13. The fixing seat is installed on one side of the motor 1. The planetary gears 22 are rotatably mounted to the fixing seat 21 on axle bores 221 such that the three planetary gears 22 are allowed to rotate around individually with respect to bearing 221. The planetary gears 22 are located between the motor 1 and the fixing seat 21. The solar gear 23 is rigidly installed on the power output section 14, enabling synchronous rotations. In addition, the solar gear 23 engages with each of the planetary gears 22 to bring each planetary gear 22 into self-rotational motion around the bearing 221.

The gear set 2 is engaged to a gear ring 33 of the case 3 to enable rotations of the case 3. Particularly, the case 3 is a hollow cylindrical case. One end of the case 3 is installed to a locking section 31. The locking section 31 includes a plurality of locking holes 311 enabling rigid fixation between the cover 34 and the locking section 31 by the locking element 312.

Figure 4:
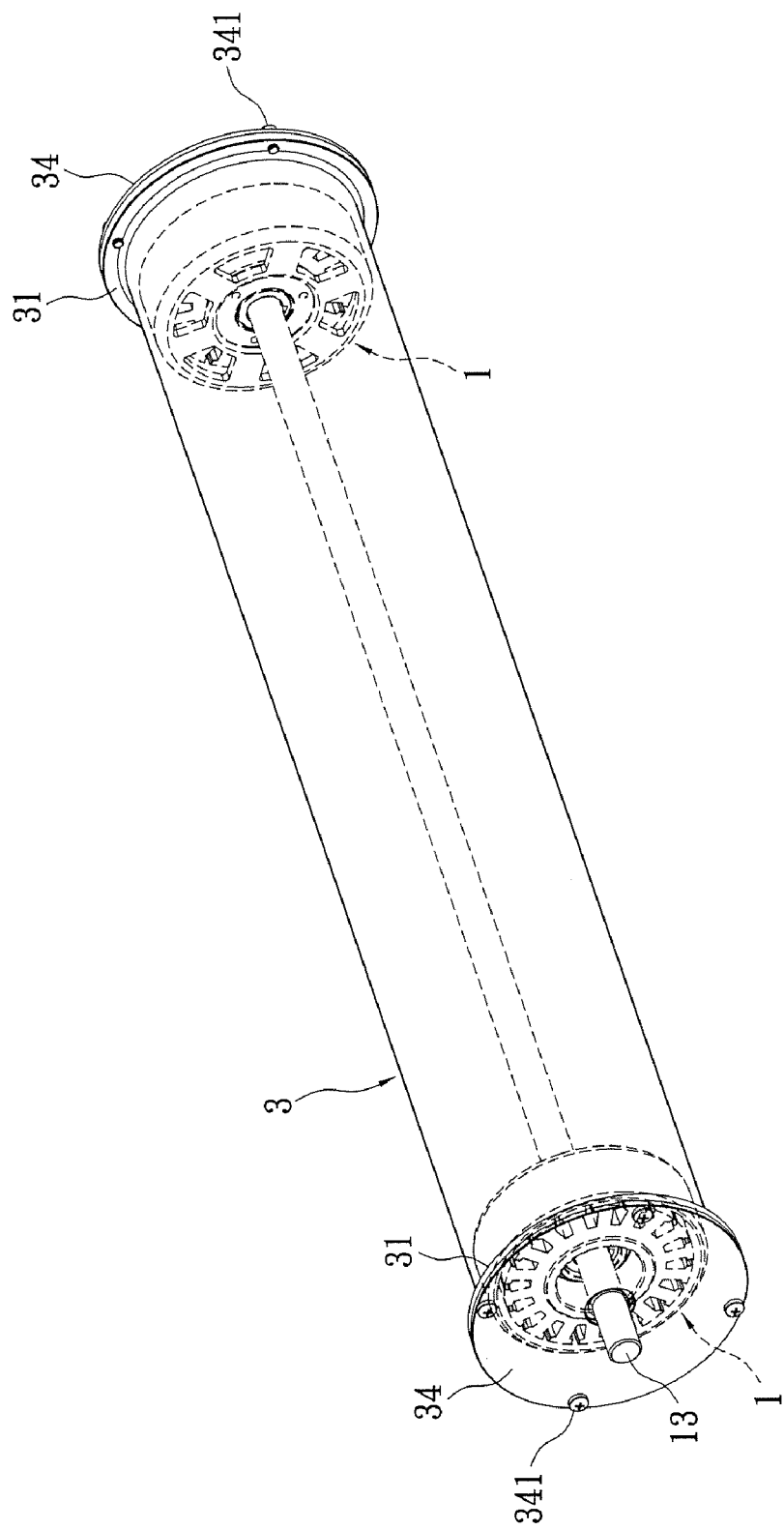
FIG. 4 is a three dimensional view for a second preferred embodiment of the treadmill roller structure according to the instant disclosure.

Inside the case 3 there is an accommodation space 32 and an inner gear ring 33. The inner gear ring 33 is rigidly installed to the inner wall of the case 3. In a first preferred embodiment, the motor 1 and the gear set 2 are placed in the accommodation space 32 inside of the case 3 with each of the planetary gears 22 simultaneously engaging with the solar gear 23 and the inner gear ring 33, such that the case 3 can be linked to rotate by means of the inner gear ring 33 as the planetary gears 22 rotate. Thus, when the power output section 14 rotates about the spindle 13, the gear set 2 will be driven to drive the inner gear ring 33, and thus causing rotation of the case 3. However, although the motor 1 and the gear set 2 according to the instant disclosure are installed to one end inside of the case 3, it is by no means limited thereto; rather, it is possible to adjust the positions inside of the case 3 wherein the motor 1 and the gear set 2 are actually placed based on application requirements for achieving the same effect as the instant disclosure. Furthermore, in a second embodiment (as shown in FIG. 4), two motors are used to drive the roller structure. One motor is installed at each end of the accommodation space 32 inside of the case 3 for enhancing the output power to the roller. Also, the roller 103 is individually installed to the front end of the base 101 and the rear end of the base 101 (as shown in FIG. 1), with one of the two rollers 103 being installed with the motor 1 and the gear set 2 so that the treadmill belt 102 can be brought to rolling motion around the front and rear rollers 103. In other words, the rear roller 103 may not require a motor 1 and a gear set 2; instead, the motor from the front roller along may provide all the driving power to the treadmill belt. Moreover, the instant disclosure employs the gear set 2 as a gear-reduction mechanism to increase torque output. For instance, the gear set 2 transfers the power from the power output section 14 having a smaller radius to the inner gear ring 33 of a greater radius, thus enabling power conversions from the power output section 14 having high rotation speed and low torque to the inner gear ring 33 of low rotation speed and high torque, thus increasing the torque output to the case 3. However, it is noted that the gear set 2 may be also replaced with other general real-reduction mechanisms for achieving the same results.

The motion limiting assemblies 4 are installed onto the spindle 13. Each motion limiting assembly 4 comprises a bearing 41 and a fastener 42. The spindle 13 passes through the motion limiting axle bore 411 of the bearing 41, and the fastener 42 is buckled onto the spindle 13. Thus, the fastener 42 props up the bearing 41 to refrain the bearing 41 from sliding.

Figure 5:
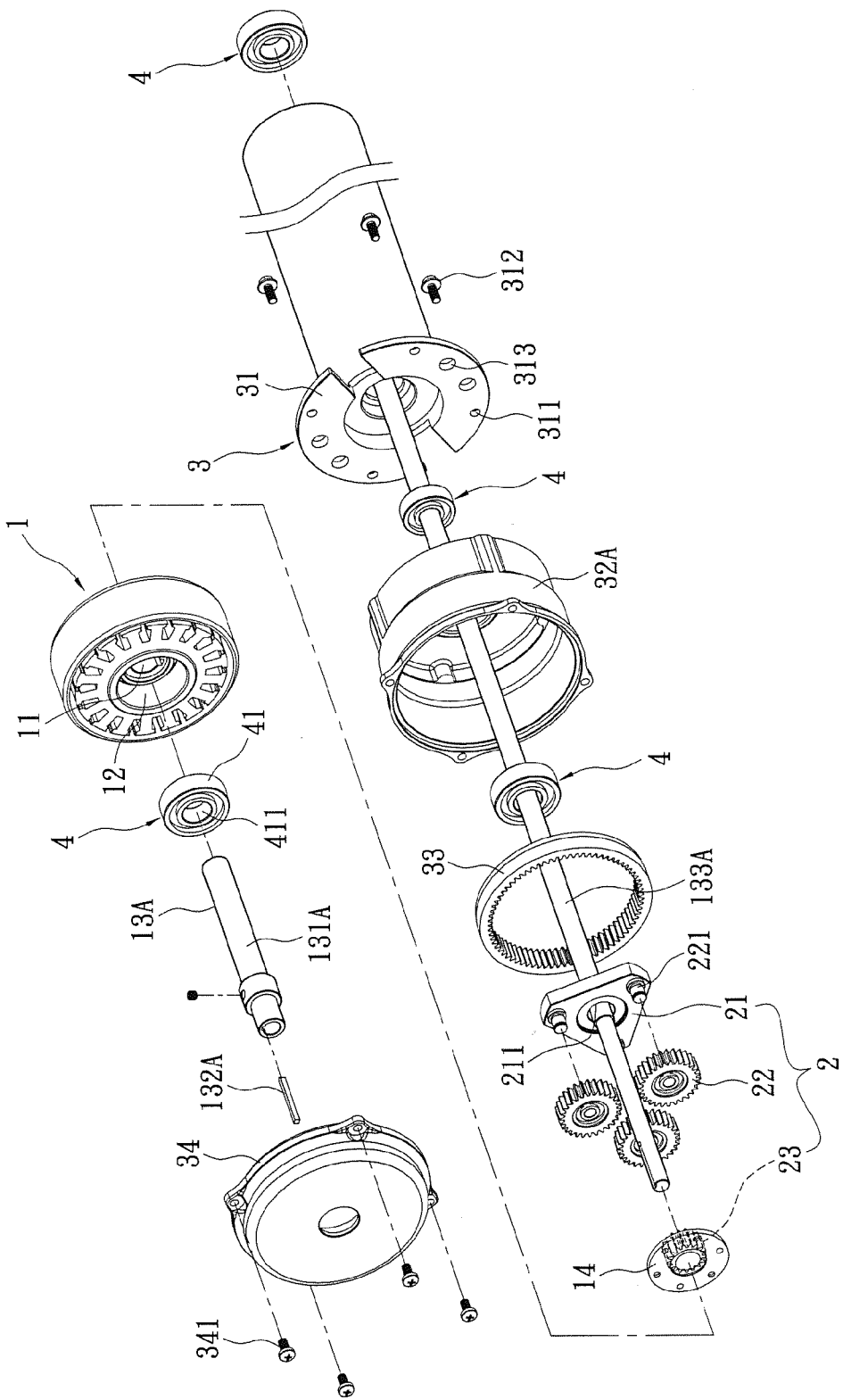
FIG. 5 is a disassembly graph for a third preferred embodiment of the treadmill roller structure according to the instant disclosure.
Figure 6:
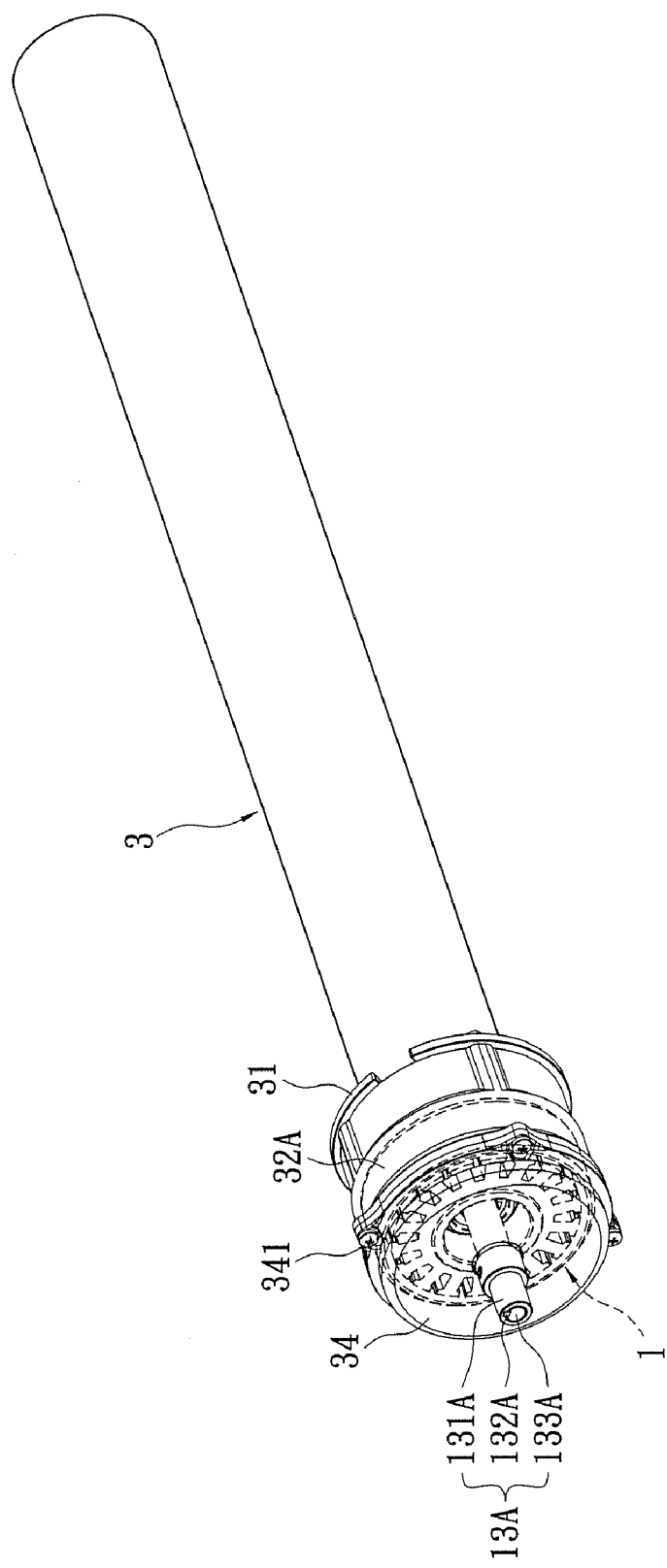
FIG. 6 is a three dimensional view for the third preferred embodiment of the treadmill roller structure according to the instant disclosure.
Figure 7:
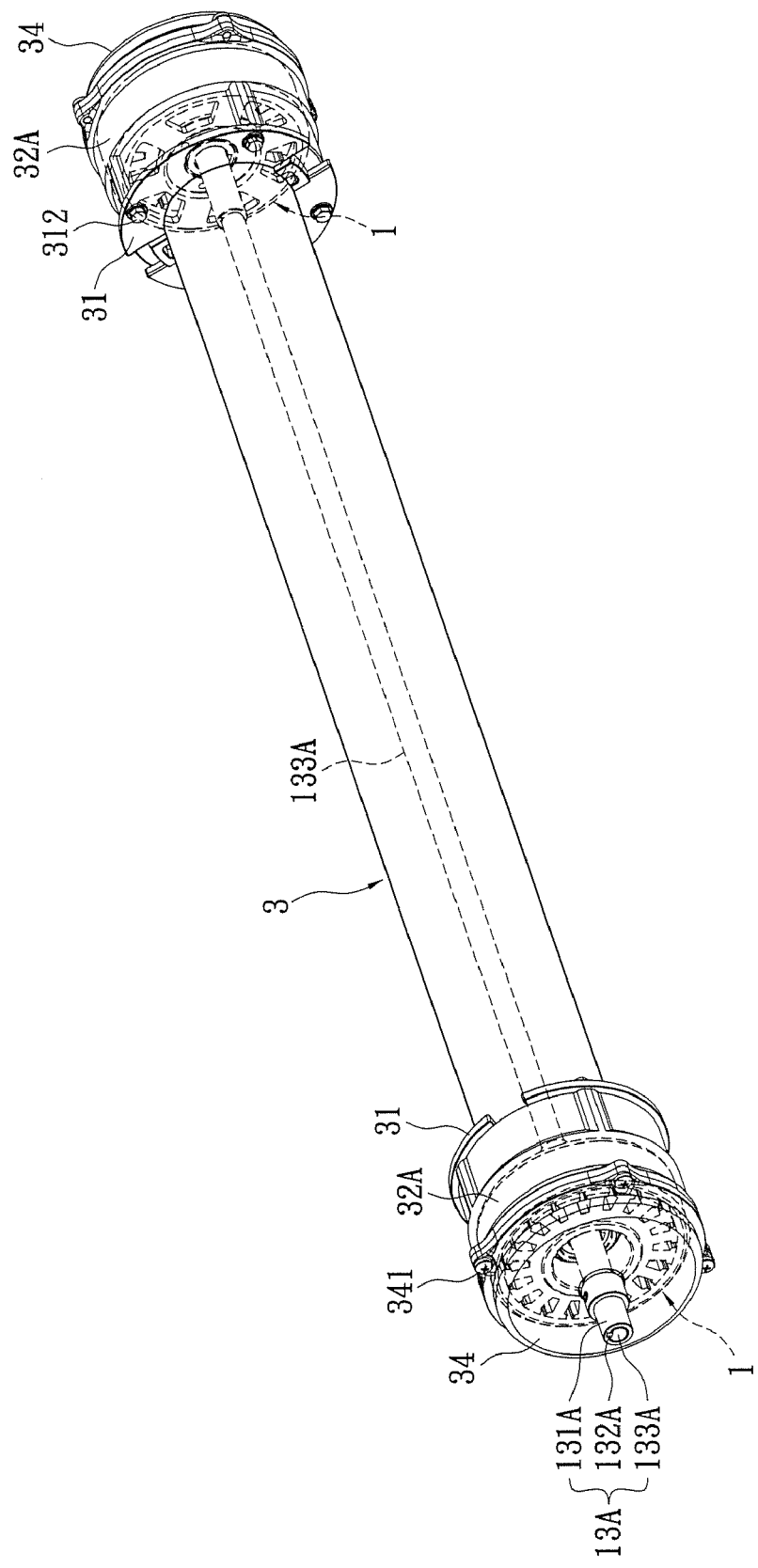
FIG. 7 is a three dimensional view for a fourth preferred embodiment of the treadmill roller structure according to the instant disclosure.

The spindle 13 and the accommodation space 32 of the instant disclosure may be of different designs, as referring to FIGS. 5 and 6. In a third preferred embodiment, the spindle 13A is installed with a motor axle 131A, a linking element 132A and a roller axle 133A, and the motor axle 131A acts as the rotation center axle of the motor 1, the roller axle 133A as the rotation center axle of the case 3, while the motor axle 131A is set to the outside of the roller axle 133A and the linking element 132A clips in connection between the motor axle 131A and the roller axle 133A (as shown in FIG. 6). Additionally, the case 3 is externally installed in fixation with an accommodation section 32A, with the accommodation section 32A being fixedly locked to the locking section 31 by means of the locking element 312, in which the inner gear ring 33 is fixedly installed onto the inner wall of the accommodation section 32A, with the motor 1 and gear set 2 being placed within the accommodation section 32A and the cover 34 being fixedly locked to the accommodation section 32A by using the locking element 341. Each of the planetary gears 22 simultaneously engages with both the solar gear 23 and the inner gear ring 33 such that the accommodation section 32A can be linked to rotate through the inner gear ring 33 when these planetary gears 22 rotate, further in turn bringing the case 3 to rotate so as to allow the case 3 to rotate relatively to the spindle 13A of the motor 1. Besides, the locking section 31 can be installed with a plurality of through holes 313 for lessening the weight of the case 3 in order to adjust power balance as the roller 103 rotates, thereby achieving the most stable and effective power output. Next, referring then to FIG. 7, in a fourth preferred embodiment of the instant disclosure, the accommodation section 32A at the both ends of the case 3 is respectively installed with a motor 1 for increasing output power of the roller.

Refer subsequently to FIG. 8, in a fifth preferred embodiment of the instant disclosure as shown, when the motor 1 and the gear set 2 are placed in the accommodation space 32 within the case 3, the motor axle 131A of the motor 1 is set on the roller axle 133A inside of the case 3 and the linking element 132A is used to clip in connection to the roller axle 133A thus also achieving the same effect.

Refer next to FIG. 9, in a sixth preferred embodiment of the instant disclosure as shown, suppose that the motor 1 and the gear set 2 are placed in the accommodation space 32 external to the case 3, the spindle 13B is now formed by connecting the motor axle 131B of the motor 1 with the roller axle 132B inside of the case 3, with motor axle 131B acting as the rotation center axle of the motor 1 and the roller axle 132B being the rotation center axle of the case 3, thus also achieving the same effect.

In summary, the instant disclosure is allowed to provide the following features:

1. since the motor 1 and the gear set 2 are installed inside or outside of the case 3, the power generated by the motor 1 can bring the case 3 to rotate directly through the engagement between the gear set 2 and the inner gear ring 33. The case 3 can thus actively rotate without additional use of belt, hence advantageously lessening motor 1 output power losses which may occur during transfer. Besides, simplified roller 103 structure also facilitates reduction of manufacture cost;

2. as the motor 1 operates, the output power from motor 1 enables the power output section 14 to rotate, thereby linking the solar gear 23 so in turn the planetary gear 22, further together generating rotations of the inner gear ring 33 and the case 3. In this way, by means of the tooth number ratio between the solar gear 23 and the planetary gear 22, the output power from the motor 1 can be amplified in multiples, efficiently transferred to the case 3 so as to increase the performance of the motor 1;

3. the motor 1 can be as demand installed inside or outside of the case 3, so it needs not to reserve space in advance for placement of the motor 1, thereby effectively scaling down the area required for installation of the treadmill 10, improving convenience in use and facilitating easy transportation.

The aforementioned texts illustrate only the preferred embodiments of the instant disclosure rather than limiting the scope of the instant disclosure thereto; all effectively equivalent changes, modifications and substitutions made in accordance with the present disclosure and appended drawings are deemed as being included in the instant disclosure defined by the following claims.

What is claimed is:

1. A treadmill comprising:
a base, having a front roller and a rear roller installed respectively at the front end and the rear end of the base; and
a treadmill belt disposed around the front roller and the rear roller, one of the front and rear rollers comprising:
a motor,
wherein the motor is an out-runner motor having a spindle and a power output section,
wherein the power output section rotates around the spindle;
a gear set rotatably installed onto the spindle,
wherein the power output section is engaged to the gear set; and
a case,
wherein the gear set is engaged to the case, causing the case to rotate about the spindle; wherein the case is externally installed in fixation with an accommodation section and an inner gear ring, in which the inner gear ring is fixedly installed onto the inner wall of the accommodation section, the motor and the gear set are placed in the accommodation section, the gear set engages with the inner gear ring and the accommodation section brings the case to rotate relatively to the spindle;
wherein the case is externally installed with another motor, in which the motor and the installed another motor are respectively placed at the two ends of the case.

2. The treadmill according to claim 1, wherein the gear set is a deceleration mechanism.

3. The treadmill according to claim 2, wherein the gear set includes a solar gear and a plurality of planetary gears, the solar gear is fixedly installed to the power output section and engages with each of the planetary gears, and an inner gear ring is fixedly installed onto the inner wall of the case, with each of the planetary gears simultaneously engaging with the solar gear and the inner gear ring.

4. The treadmill according to claim 3, wherein the planetary gears are rotatably installed on a fixing seat, and wherein the fixing seat is fixed on the spindle and placed on one side of the motor, and the planetary gears are rotatably located between the motor and the fixing seat.

5. The treadmill according to claim 1, wherein the spindle passes through the motor, the gear set, and the case.

6. The treadmill according to claim 1, wherein the spindle is installed with a motor axle, a linking element and roller axle, in which the motor axle acts as the rotation center axle of the motor, the roller axle acts as the rotation center axle of the case, the motor axle is set outside of the roller axle, and the linking element clips in connection to the motor axle and the roller axle.

7. A treadmill, comprising:
a base, having a front roller and a rear roller installed respectively at the front end and the rear end of the base; and
a treadmill belt disposed around the front roller and the rear roller, one of the front and rear rollers comprising:
a motor, being an out-runner motor having a spindle fixedly installed to the base and a power output section, wherein the power output section is rotatably installed relative to the spindle for transmitting a rotating power of the motor;
a gear set rotatably installed around the spindle, wherein the power output section is engaged to the gear set; and
a case, wherein the gear set is engaged to the case, causing the case to rotate about the spindle;
wherein the case has an accommodation housing fixed at a periphery thereof and an inner gear ring, wherein the inner gear ring is fixedly installed onto an inner wall of the accommodation housing, the motor and the gear set are placed in the accommodation housing, the gear set is engaged with the inner gear ring, and the accommodation housing brings the case to rotate relatively to the spindle.

8. The treadmill according to claim 7, wherein the gear set is a gear-reduction mechanism.

9. The treadmill according to claim 8, wherein the gear set includes a solar gear and a plurality of planetary gears, the solar gear is fixedly installed to the power output section and engages with each of the planetary gears, and an inner gear ring is fixedly installed onto the inner wall of the case, with each of the planetary gears simultaneously engaging with the solar gear and the inner gear ring.

10. The treadmill according to claim 9, wherein the planetary gears are rotatably installed on a fixing seat, and wherein the fixing seat is fixed on the spindle and placed on one side of the motor, and the planetary gears are rotatably located between the motor and the fixing seat.

11. The treadmill according to claim 7, wherein the spindle passes through the motor, the gear set, and the case.

12. The treadmill according to claim 7, wherein the spindle is installed with a motor axle, a linking element and roller axle, in which the motor axle acts as the rotation center axle of the motor, the roller axle acts as the rotation center axle of the case, the motor axle is set outside of the roller axle, and the linking element clips in connection to the motor axle and the roller axle.

* * * * *